United States Patent
Blott et al.

(10) Patent No.: US 6,721,314 B1
(45) Date of Patent: Apr. 13, 2004

(54) METHOD AND APPARATUS FOR APPLYING ONCE-ONLY PROCESSING IN A DATA NETWORK

(75) Inventors: Stephen Michael Blott, Gillette, NJ (US); Yuri Breitbart, Madison, NJ (US); Clifford Eric Martin, Martinsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/316,118

(22) Filed: May 20, 1999

(51) Int. Cl.[7] .............................................. H04L 12/28
(52) U.S. Cl. ................... 370/389; 455/406; 379/114.08
(58) Field of Search ...................... 379/114.01, 114.08, 379/114.28; 455/406, 407, 408; 370/259, 260, 262, 229, 230, 230.1, 231, 389, 392, 395.2, 401, 402, 403, 404, 408

(56) References Cited

U.S. PATENT DOCUMENTS

| | | | | |
|---|---|---|---|---|
| 5,793,763 A | * | 8/1998 | Mayes et al. ................ 370/389 |
| 6,141,652 A | * | 10/2000 | Reeder ......................... 705/53 |
| 6,185,680 B1 | * | 2/2001 | Shimbo et al. ............. 713/160 |
| 6,188,683 B1 | * | 2/2001 | Lang et al. .................. 370/352 |
| 6,240,091 B1 | * | 5/2001 | Ginzboorg et al. ......... 370/401 |
| 6,243,667 B1 | * | 6/2001 | Kerr et al. ..................... 703/27 |
| 6,430,596 B1 | * | 8/2002 | Day, II ........................ 709/202 |

* cited by examiner

Primary Examiner—Alpus H. Hsu
Assistant Examiner—Thien D Tran
(74) Attorney, Agent, or Firm—Jeffrey M. Weinick; Donald P. Dinella

(57) ABSTRACT

Duplicate processing at network operators is avoided by applying once-only processing at operators which are adjacent to either the source or destination host of a data packet. An operator is adjacent to a host if there exists a path between the operator and the host containing no other operators. In one embodiment, an operator determines that it is adjacent to a host if it receives a special broadcast data packet from the host. To ensure that no other operators receive the special broadcast data packet, the adjacent operator drops the packet. In another embodiment, operators determine whether they are adjacent to identified hosts by transmitting special ping packets to the hosts. If an operator receives a ping response from the host, the operator determines that it is adjacent to the host. To ensure that only adjacent operators receive ping responses, intervening operators drop special ping packets received from other operators.

9 Claims, 2 Drawing Sheets

METHOD AND APPARATUS FOR APPLYING ONCE-ONLY PROCESSING IN A DATA NETWORK

FIELD OF THE INVENTION

The present invention relates generally to data networks. More particularly, the present invention relates to avoiding duplicate processing in data networks.

BACKGROUND OF THE INVENTION

Various operations are applied to data packets as they are transmitted through a data network. Such operations include, for example, routing, tagging, compression, accounting, encryption, and shaping. Some operations, for example routing, are applied to every data packet at every node. Other operations, for example encryption, must be, or are best, applied to each data packet only once during transmission through the network.

In general, there are two reasons why an operation should be applied to a packet only once, correctness and efficiency. First, it may be incorrect to apply an operation more than once. For example, in a billing application, it is appropriate to capture usage data from a data packet once. Capturing usage data twice, at two separate network nodes, may result in double billing, which is considered incorrect. For example, copending patent application Ser. No. 09/315,636, entitled Method And Apparatus For Associating Network Usage With Particular Users, describes a monitoring system in which usage data is collected for particular users. If such a monitoring system is used in conjunction with a billing application, it may be incorrect to capture usage information two or more times at different network nodes.

The second reason why an operation should be applied to a packet only once is efficiency. If an operation is costly and there is no advantage to applying the operation multiple times, then the operation should be applied only once, even if multiple applications of the operation would not be incorrect. Examples of these types of operations include encryption and compression. For these operations there is a significant cost associated with applying the operation, and there is no advantage to applying the operation multiple times. Moreover, since the complementary operations of decryption and decompression must ultimately be applied to the data, it is usually useful to ensure that these operations are applied only once.

Large networks may contain many network nodes that are capable of applying a given once-only operation. Moreover, during a packet's traversal of the network, the packet may be handled by several of such nodes. This gives rise to the problem of how a given network node should determine, upon receipt of a data packet, whether a once-only operation has been applied, or whether the once-only operation needs to be applied by the given network node.

SUMMARY OF THE INVENTION

In accordance with the present invention duplicate processing at network nodes is avoided by applying once-only processing at network nodes which are so-called adjacent to either the source or destination of a data packet.

The term operator is used to refer to a network node which is capable of applying a once-only operation and the term host is used to refer to an end user machine which generates and receives data packets. Thus, in accordance with the invention, an operator applies once-only processing to a data packet only if the operator is adjacent to the source or destination host of the data packet. An operator is adjacent to a host if there exists a path between the operator and the host containing no other operators.

In accordance with one embodiment of the invention, prior to transmitting a data packet to a destination, a host broadcasts a special data packet. If an operator receives the special data packet, the operator determines that it is adjacent to that host. Further, to ensure that no other operators receive the special data packet, the receiving operator drops the data packet. In this way, only operators which are adjacent to hosts will receive the special data packet which is broadcast from the host.

A second embodiment of the invention consists of two phases. During phase one, a controller node in the network first transmits identifications of hosts which are of interest to operators. A host is of interest to an operator if the data packets from the host require once-only processing. Thus, at the end of phase one, the operators in the network are aware of hosts whose data packets require once only processing, but the operators do not yet know whether they are adjacent to those hosts. During phase two, the operators transmit special ping packets to the hosts identified in phase one. Upon receipt of a ping packet, a host will reply with a ping response. Upon receipt of a ping response, an operator will determine that it is adjacent to the host transmitting the ping response. To ensure that only adjacent operators will receive ping responses, operators drop any special ping packets received from other operators. In this way, intervening operators intercept and drop special ping packets from non-adjacent operators, such that the special ping packets from non-adjacent operators never reach the destination host, thus ensuring that no ping response will be received by the non-adjacent host.

These and other advantages of the invention will be apparent to those of ordinary skill in the art by reference to the following detailed description and the accompanying drawings.

DETAILED DESCRIPTION

Figure 1:
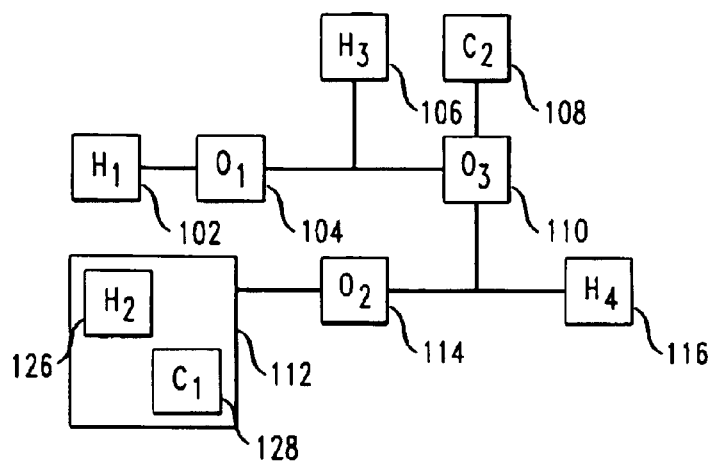
FIG. 1 illustrates a network topology of a portion of a data network in which the present invention may be implemented.

FIG. 1 illustrates a network topology of a portion of a data network in which the present invention may be implemented. FIG. 1 shows three types of network nodes, hosts (H), operators (O), and controllers (C). Hosts are end-user machines that are connected to the data network and generate network traffic. Operators are network nodes that are capable of applying once-only operations to received data packets. Operators may be network nodes which are dedicated to the function of applying the once-only operation. Operators may also serve other purposes, in addition to applying the once-only operation. For example, an operator may be a router that, in addition to routing data packets, also applies the once-only function. Controllers are network nodes that disseminate information to operators regarding the hosts whose traffic is of interest. Thus, a controller will disseminate identifications of hosts, the data traffic of which, when received by an operator, may require the application of a once-only operation. For example, consider an operator that performs network monitoring to collect billing information for particular hosts. A controller will disseminate the identification of the particular hosts for which the operator is to collect such billing information. FIG. 1 shows hosts $H_1$ 102, $H_3$ 106, $H_4$ 116, operators $O_1$ 104, $O_2$ 114, $O_3$ 110, and controller $C_2$ 108. Node 112 represents a node in which the host $H_2$ 126 and controller $C_1$ 128 are co-resident on the single node 112.

Figure 4:
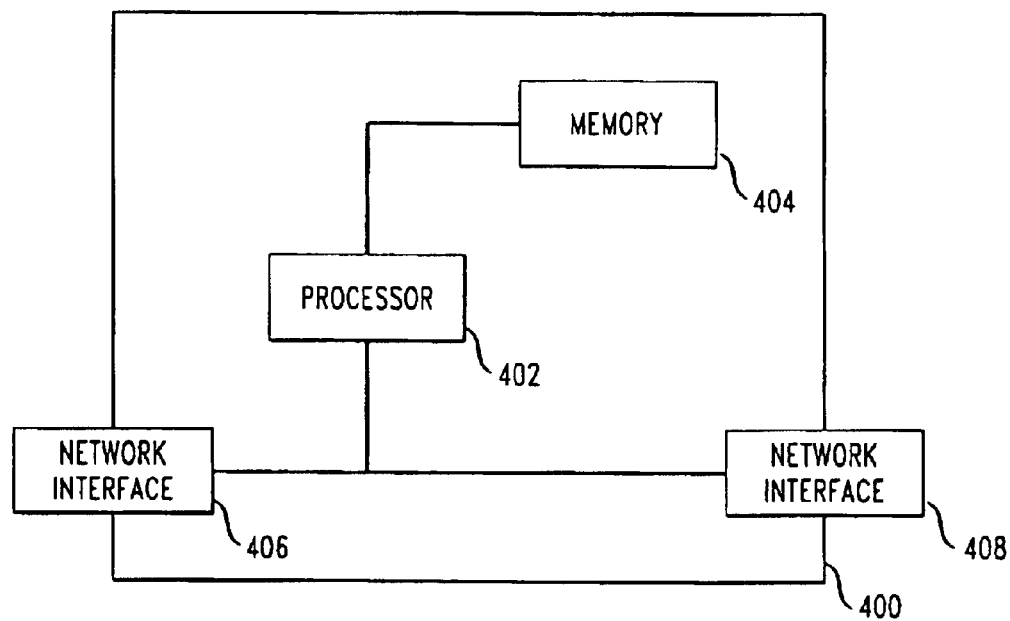
FIG. 4 shows a block diagram of the components of one embodiment of an operator.

Network operators in accordance with the present invention may be implemented by appropriately configured digital computers. FIG. 4 shows a block diagram of the components of one embodiment of a network operator 400. Operator 400 includes a processor 402 for controlling the overall function of the operator 400. Processor 402 operates in accordance with stored computer program code, which is stored in memory 404. Memory 404 represents any type of computer readable medium and may include, for example, RAM, ROM, optical disk, magnetic disk, or a combination of these media. The processor 402 executes the computer program code in memory 404 in order to control the functioning of the operator 400. Processor 402 is also connected to network interfaces 406, 408 which receive and transmit network data packets. Given the present description of the invention, one skilled in the art could readily implement the invention using programmed digital computers. Of course, the actual implementation of a network node in accordance with the invention would also include other components as well. However, for clarity, such other components are not shown in FIG. 4.

As an example, consider host $H_1$ 102 (FIG. 1) sending a data packet to host $H_3$ 106 where the data packet needs a once-only operation applied to it. Since operator $O_1$ 104 is the only operator in the path between $H_1$ 102 and $H_3$ 106, operator $O_1$ 104 will apply the once only operation and there is no danger of the operation being applied multiple times. However, consider host $H_1$ 102 sending a data packet to host $H_4$ 116. Operators $O_1$ 104 and $O_3$ 110 are both in the path between $H_1$ 102 and $H_4$ 116 and so there is a danger that the operation will be applied by both operator $O_1$ 104 and $O_3$ 110. Similarly, consider host H1 102 sending a data packet to host $H_2$ 126, in which case there is a danger of having the once-only operation applied three times by operators $O_1$ 104, $O_3$ 110, and $O_2$ 114.

The present invention provides a technique for applying once-only operations at a single network operator even if a data packet traverses multiple operators. In accordance with the technique, if a once-only operation can be applied by several network operators, then it is applied only by the operator which is closest to either the packet's source or destination (depending on the type of operation). We define a network operator which is capable of performing an operation as being adjacent to a host if there exists a path between the operator and the host containing no other element capable of applying the operation. Thus, in accordance with the invention, an operator will apply a once-only operation to a data packet if the operator is adjacent to the packet's source or destination. Whether a given operation is applied at an operator node which is adjacent to a packet's source or destination (or both) generally depends upon the operation itself. For example, compression and encryption operations are generally applied at an operator node adjacent to the packet's source, while decompression and decryption operations are generally applied at an operator node adjacent to the packet's destination. It may be appropriate to apply accounting operations at operator nodes adjacent to both the packet's source and destination.

Referring to the example network topology shown in FIG. 1, operator $O_1$ 104 is adjacent to hosts $H_1$ 102 and $H_3$ 106; operator $O_2$ 114 is adjacent to hosts $H_2$ 126 and $H_4$ 116; and operator $O_3$ 110 is adjacent to hosts $H_3$ 106 and $H_4$ 116.

We now provide two methods for an operator to determine whether it is adjacent to a particular host. The first method is used where a controller and host are co-resident on a network node, such as host $H_2$ 126 and controller $C_1$ 128 on network node 112. The second method is used where the controller and host are not co-resident.

Figure 2:
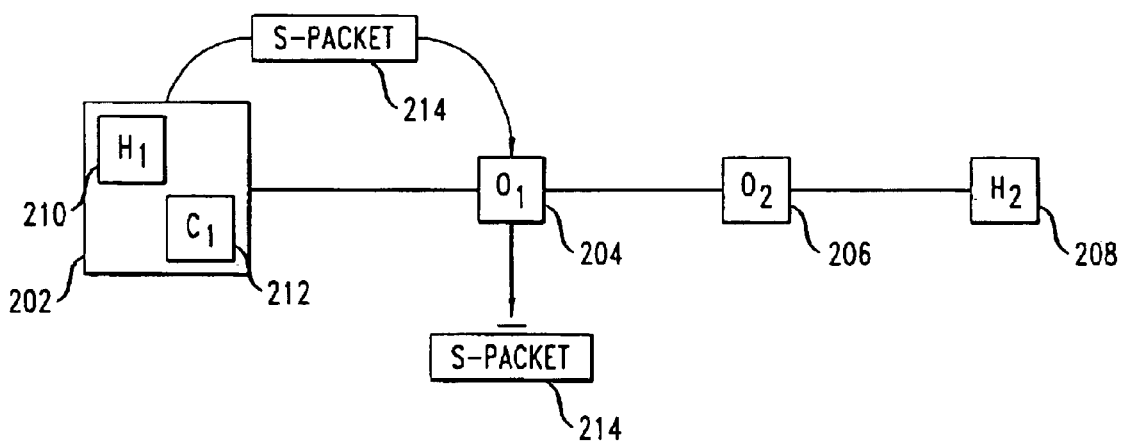
FIG. 2 illustrates a first method for an operator to determine whether it is adjacent to a particular host.

The first method is described in conjunction with FIG. 2. Consider a host $H_1$ 210 which is co-resident with controller $C_1$ 212 on network node 202. Host $H_1$ 210 wants to send a data packet to host $H_2$ 208. The data packet sent from $H_1$ 210 to $H_2$ 208 will pass through operators $O_1$ 204 and $O_2$ 206. In accordance with the method, prior to a host sending a data packet to a new destination host, the co-resident controller sends a special data packet, called an s-packet, to the destination host. The s-packet includes an identification of the co-resident host and some other indication identifying the packet as an s-packet. For example, s-packets may be based on the Internet Control Message Protocol (ICMP), with the packet payload encoded in such a way that s-packets can readily be distinguished from regular ICMP packets. Any operator receiving the s-packet concludes that it is adjacent to the identified host and thereafter drops the s-packet without forwarding it further towards its destination. This ensures that no other downstream operator receives the s-packet. With reference to FIG. 2, if host $H_1$ 210 is about to send a data packet to destination host $H_2$ 208 for the first time, controller $C_1$ 212 first sends an s-packet 214 addressed to host $H_2$ 208. The s-packet 214 is received at operator $O_1$ 204. Upon receipt of the s-packet 214, operator $O_1$ 204 determines that it is adjacent to host $H_1$ 210, and drops the s-packet 214. As such, operator $O_1$ 204 knows that it is adjacent to host $H_1$ 210 and that it should apply once-only operations to data packets associated with host $H_1$ 210 (i.e. host $H_1$ 210 is either the source or destination host of the data packet). Further, since operator $O_1$ 204 dropped the s-packet 214, operator $O_2$ 206 does not receive the s-packet and operator $O_2$ 206 will not apply once-only operations to data packets associated with host $H_1$ 210. Thus, when data packets from host $H_1$ 210 are received at operator $O_2$ 206 on their way to host $H_2$ 208, operator $O_2$ 206 will not apply the once-only operation to the data packet, but instead will merely forward the data packet to its destination $H_2$ 208.

The second method for an operator to determine whether it is adjacent to a particular host will now be described. The second method is used where the controller and host are not co-resident. This method occurs in two phases. During the first phase, the controller broadcasts, to all operators, the identification of a host whose data packets require a once-only operation. Thus, at the end of phase one, all operators are aware of the existence of the host, but the operators do not yet know whether they are adjacent to the host. In the second phase, each operator attempts to determine whether it is adjacent to the host by using a ping technique. A ping is a well known Internet Protocol (IP) technique in which a first network node transmits a ping packet to a second network node. Upon receipt of a ping packet a node responds with a ping response. Pings are well known in the art of data networks and are generally used to test network connectivity or to determine whether a node is active.

In accordance with one embodiment of the invention, during phase two, every operator which received a host identification during phase one sends a special ping, called an s-ping, to the identified host. Further, if an operator receives an s-ping destined for a host from another operator, the operator drops the s-ping. When a host receives an s-ping, it responds with an s-ping response. In accordance with phase two, hosts will only receive s-pings from adjacent operators because non-adjacent operators will have their s-pings dropped by the intervening operator. Thus, if an operator receives an s-ping response from a host, the operator determines that it is adjacent to that host and that it should apply once-only operations to data packets associated with that host. If an operator does not receive an s-ping response within a predetermined time period, the operator will determine that it is not adjacent to the host and that it should not apply once-only operations to data packets associated with that host. An appropriate time period may be, for example, on the order of 1–2 seconds or less.

Figure 3:
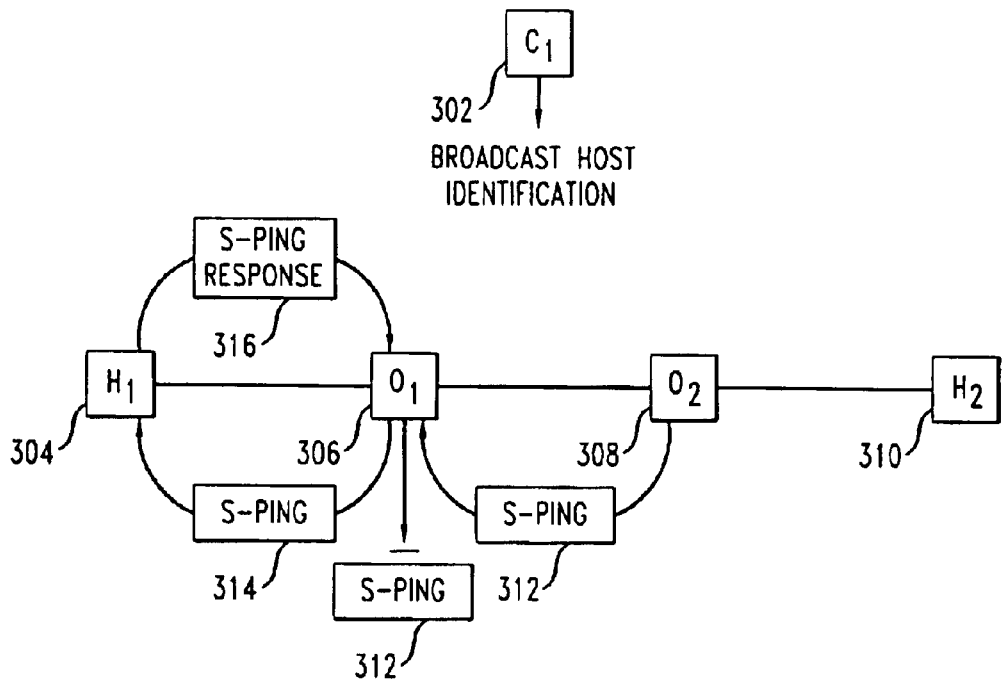
FIG. 3 illustrates a second method for an operator to determine whether it is adjacent to a particular host.

The second method is described in further detail in the context of a particular example in conjunction with FIG. 3. In FIG. 3, controller $C_1$ 302 is not co-resident with a host. It is assumed that controller $C_1$ 302 is knowledgeable about hosts and when host data packets require once-only operations from the operators in the network. For example, controller $C_1$ 302 may be a network authentication node that authenticates hosts on the network. When a host authenticates on the network, controller $C_1$ 302 may send an identification of that host to the operators in the network such that the operators can apply billing operations to data packets which originate from, or are destined to (i.e., are associated with), that node. Thus, referring to FIG. 3, assume that data packets associated with host $H_1$ 304 require once-only processing by operators in the network. During phase one, controller $C_1$ 302 broadcasts to operators $O_1$ 306 and $O_2$ 308 the identification of host $H_1$ 304. Thus, at the end of phase one, operators $O_1$ 306 and $O_2$ 308 are aware that data packets associated with host $H_1$ 304 require once-only processing, but the operators $O_1$ 306 and $O_2$ 308 do not yet know whether they are adjacent to host $H_1$ 304.

During phase two, operators $O_1$ 306 and $O_2$ 308 transmit s-pings 314 and 312 respectively to host $H_1$ 304. S-ping 312 generated by operator $O_2$ 308 will be received by operator $O_1$ 306 and operator $O_1$ 306 will drop s-ping 312. Thus, only s-ping 314 transmitted by operator $O_1$ 306 will reach host $H_1$ 304. Upon receipt of the s-ping 314, host $H_1$ 304 will respond with s-ping response 316. Upon receipt of the s-ping response 316, operator $O_1$ 306 will determine that it is adjacent to host $H_1$ 304 and that it should apply once-only operations to data packets associated with host $H_1$ 304. Operator $O_2$ 308 will not receive an s-ping response because its s-ping 312 was dropped by operator $O_1$ 306. Thus, operator $O_2$ 308 will not receive an s-ping response within the predetermined time period and it will determine that it is not adjacent to host $H_1$ 304. As such, operator $O_2$ 308 will not apply once-only operations to data packets associated with host $H_1$ 304.

In accordance with an embodiment of the invention, controllers may periodically repeat the dissemination of information about hosts. This helps deal with the possibility that some data packets may be lost. Further, it addresses periodic changes in the network topology.

The principles of the present invention may be applied to any network application which requires of once-only operations. For example, and without limitation, such network applications include accounting, billing, compression, tunneling, encryption, packet tagging for quality of service, and end-to-end measurement of quality of service (e.g., latency or bandwidth).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for avoiding duplicate processing at a data network node comprising the steps of:

determining whether said network node is adjacent to a host;

receiving a data packet associated with said host; and applying a once-only operation to said data packet only if said network node is adjacent to said host;

wherein said step of determining comprises the steps of:
receiving a broadcast data packet which is seperate from said data packet and determining, in response to receipt of said broadcast data packet, that said network node is adjacent to said host, wherein said adjacency between said network node and said host is found only when there is a path between said network node and said host containing no other data network node capable of applying said once-only operation to said data packet other than said network node; and dropping said-broadcast data packet.

2. The method of claim 1 wherein said broadcast data packet is transmitted from a controller co-located with said host.

3. The method of claim 1 wherein said data packet is associated with said host if said host is the source or destination of said data packet.

4. A method for avoiding duplicate processing at a data network node comprising the steps of:

determining whether said network node is adjacent to a host;

receiving a data packet associated with said host; and applying a once-only operation to said data packet only if said network node is adjacent to said host;

wherein said step of determining comprises the steps of:
transmitting a ping packet to said host;
receiving a ping response and determining, in response to receipt of said ping response, that said network node is adjacent to said host, wherein said adjacency between said network node and said host is found only when there is a path between said network node and said host containing no other data network node capable of applying said once-only operation to said data packet other than said network node; and dropping ping packets received from other network nodes.

5. The method of claim 4 wherein said ping packet is transmitted in response to host information received from a network controller.

6. A network node comprising:

means for determining whether said network node is adjacent to a host;

means for receiving a data packet associated with said host; and means for applying a once-only operation to said data packet only if said network node is adjacent to said host;

wherein said means for determining comprises:
  means for receiving a broadcast data packet which is seperate from said data packet and determining, in response to receipt of said broadcast data packet, that said network node is adjacent to said host, wherein said adjacency between said network node and said host is found only when there is a path between said network node and said host containing no other data network node capable of applying said once-only operation to said data packet other than said network node; and
  means for dropping said broadcast data packet.

7. The network node of claim 6 wherein said broadcast data packet is received from a controller co-located with said host.

8. A network node comprising:
  means for determining whether said network node is adjacent to a host;
  means for receiving a data packet associated with said host; and
  means for applying a once-only operation to said data packet only if said network node is adjacent to said host;
wherein said means for determining comprises:
  means for transmitting a ping packet to said host;
  means for receiving a ping response and determining, in response to receipt of said ping response, that said network node is adjacent to said host, wherein said adjacency between said network node and said host is found only when there is a path between said network node and said host containing no other data network node capable of applying said once-only operation to said data packet other than said network node; and
  means for dropping ping packets received from other network nodes.

9. The network node of claim 8 further comprising:
  means for transmitting said ping packet in response to host information received from a network controller.

* * * * *